US006552652B2

(12) United States Patent
Beken

(10) Patent No.: US 6,552,652 B2
(45) Date of Patent: Apr. 22, 2003

(54) RESCUE DEVICE

(75) Inventor: Robert A. Beken, San Diego, CA (US)

(73) Assignee: Synergy Microsystems, Inc., San Diego, CA (US)

(*) Notice: Subject to any disclaimer, the term of this patent is extended or adjusted under 35 U.S.C. 154(b) by 0 days.

(21) Appl. No.: 09/971,696

(22) Filed: Oct. 9, 2001

(65) Prior Publication Data

US 2002/0053974 A1 May 9, 2002

Related U.S. Application Data

(60) Provisional application No. 60/246,687, filed on Nov. 9, 2000.

(51) Int. Cl.[7] .................................................. H04B 3/36
(52) U.S. Cl. .................... 340/407; 340/540; 340/539; 340/407.1; 340/573.1; 340/573.6
(58) Field of Search ........................ 340/407.1, 540, 340/539, 573.1, 573.6, 574, 686.1, 984, 989, 990; 342/126, 357, 450, 457

(56) References Cited

U.S. PATENT DOCUMENTS

| | | | | | |
|---|---|---|---|---|---|
| 3,588,858 | A | * | 6/1971 | Demuth | 340/502 |
| 3,784,842 | A | * | 1/1974 | Kremer | 307/326 |
| 4,058,802 | A | * | 11/1977 | Meyers | 340/517 |
| 4,598,272 | A | * | 7/1986 | Cox | 340/539 |
| 4,665,385 | A | * | 5/1987 | Henderson | 340/539 |
| 4,675,656 | A | * | 6/1987 | Narcisse | 340/539 |
| 4,777,478 | A | * | 10/1988 | Hirsoh et al. | 340/573.3 |
| 4,785,291 | A | * | 11/1988 | Hawthorne | 340/573.4 |
| 6,198,390 | B1 | * | 3/2001 | Schlager et al. | 340/540 |

* cited by examiner

Primary Examiner—Daryl Pope
(74) Attorney, Agent, or Firm—Roy W. Latham

(57) ABSTRACT

A rescue device with a GPS receiver, a computer, and vibration sensors. The device detects and distinguishes vibrations and sends a radio message to a Low Earth Orbit satellite that relays messages to a monitoring facility indicating the type of vibration detected. The geographic location of the device is included in the message. The entire device is constructed to resist vandalism and to permit it to be dropped from an aircraft for installation.

5 Claims, 4 Drawing Sheets

RESCUE DEVICE

REFERENCE

The information, data and all benefits of provisional application No. 60/246,687 filed Nov. 9, 2000 are incorporated by reference into this description.

BACKGROUND OF THE INVENTION

The writing, the subject matter, and the description presented herein is protected under the provisions of United States Copyright laws by the inventor, except only to any extent required by law in order to obtain and to continue all patent protection that is available during the term of any patent that issues hereon.

1. Field of the Invention

The present invention, generally, is a system including method and apparatus for obtaining help from a remote location and, more particularly, relates to a Global Positioning Satellite (GPS) system that is responsive to predetermined computer programs.

Prior to the advent of public telephones and cell phones, many governmental agencies placed "call boxes" on city street corners to permit citizens to call for special assistance. Often there would be a black and white painted call box for calling police and a red and white painted call box for calling the fire brigade.

Today, the freeways of the United States and the highways in much of the modern world are spotted with emergency call boxes that allow drivers in need to call for assistance. These call boxes are usually, but not always, connected to an emergency call center by radio. The technology used typically is the same technology as is used in cellular telephones.

There are many areas of the country and the world where cell phones are not useable and where even simple wire telephones are absent. In the United States these areas include the rugged border areas between the United States and Mexico and the tree shrouded northern states along the border with Canada. Individuals and undocumented immigrants can and do perish in these remote areas.

In addition, many parts of the country, including national parks, are hazardous places with communications limited to ranger stations and hunting lodges. Once out on the trail, the general public can have no means of communication to summon aid.

Further, many locations where a rescue communication system would be ideal are incompatible with current technology because there is no convenient way to install such systems. Indeed, there may not be access roads or even foot trails.

Moreover, existing remote communications systems require routine maintenance to replace batteries and electronics. Most existing remote communications systems have no provision for self-diagnosis, nor do they have pro-active self-maintenance capabilities.

Pro-active self-maintenance capability includes the ability to send an alert message to a monitoring facility noting that the rescue device is either "useable" or "damaged". Most remote communication systems do not even have the ability to respond to status request calls from a monitoring facility.

Furthermore, existing remote communication systems, such as a conventional pay telephone, call box, or cellular telephone are easily damaged and often are the target of vandalism and theft, particularly when a device is located out of public view.

2. Description of the Prior Art

Previous efforts to provide a method and apparatus to call for emergency aid have taken many forms.

For example, U.S. Pat. No. 5,742,666 describes a cellar telephone system that dials a predetermined number automatically in case of emergency. Activation is by a user or automatically by the device should it detect an emergency.

U.S. Pat. No. 5,365,570 describes a radio telephone system that dials a predetermined number in case of an emergency when activated by the user.

U.S. Pat. No. 6,038,438 describes a mobile telephone that includes an emergency radio beacon transmitter that can be activated by emergency center personnel. Emergency response personnel then can home in on the radio beacon.

U.S. Pat. No. 4,296,496 describes an emergency radio system that broadcasts a distress signal to radios in the immediate area regardless of the particular channel to which the radio is tuned.

U.S. Pat. No. 3,864,674 describes a radio warning system that includes emergency condition sensors and a transmitter with unique identification signals that permits remotely located operators to determine the existence and location of the emergency.

U.S. Pat. No. 5,355,140 describes an emergency radio that, when activated, transmits time and GPS-determined location on one or more emergency frequencies.

U.S. Pat. No. 5,852,401 describes a wristwatch type emergency radio that, when activated, transmits GPS-determined location by radio.

U.S. Pat. No. 5,502,446 describes a GPS-based rescue network in which individual receivers transmit their respective positions to other units in the network.

"GPS" is the global positioning satellite system that permits users to determine geographic location accurately.

While each of these prior arrangements may be effective for their stated purpose, the system of the present invention provides other advantages not available and not even contemplated by any of the prior arrangements.

OBJECTS AND BRIEF SUMMARY OF THE INVENTION

It is a principal object of the present invention to provide a communications system for use in hostile and/or remote locations.

It is also an object of the present invention is to provide a communications system for use in locations not readily accessible.

Another object of the present invention is to provide a communications system that can be installed from the air, not requiring ground access to the site for installation.

Briefly, the invention includes a remote communications device having a signal transmitter, a receiver, a GPS receiver, a data processor, and a power control system. A robust alarm ring, when moved, produces vibrations that are sensed by the device. Vibration sensors also monitor proximity events and activities and send a message to a monitoring facility. All messages sent to the monitoring facility include a unique code to identify the individual rescue device and its location.

The above and other objects and advantages of the present invention will become more readily apparent from the following detailed description of the presently preferred embodiment taken in conjunction with the accompanying drawings.

BRIEF DESCRIPTION OF THE DRAWINGS

In the drawings, the same reference numerals are used to identify the same or similar component parts, in which.

DETAILED DESCRIPTION OF THE PRESENT INVENTION

Figure 1:
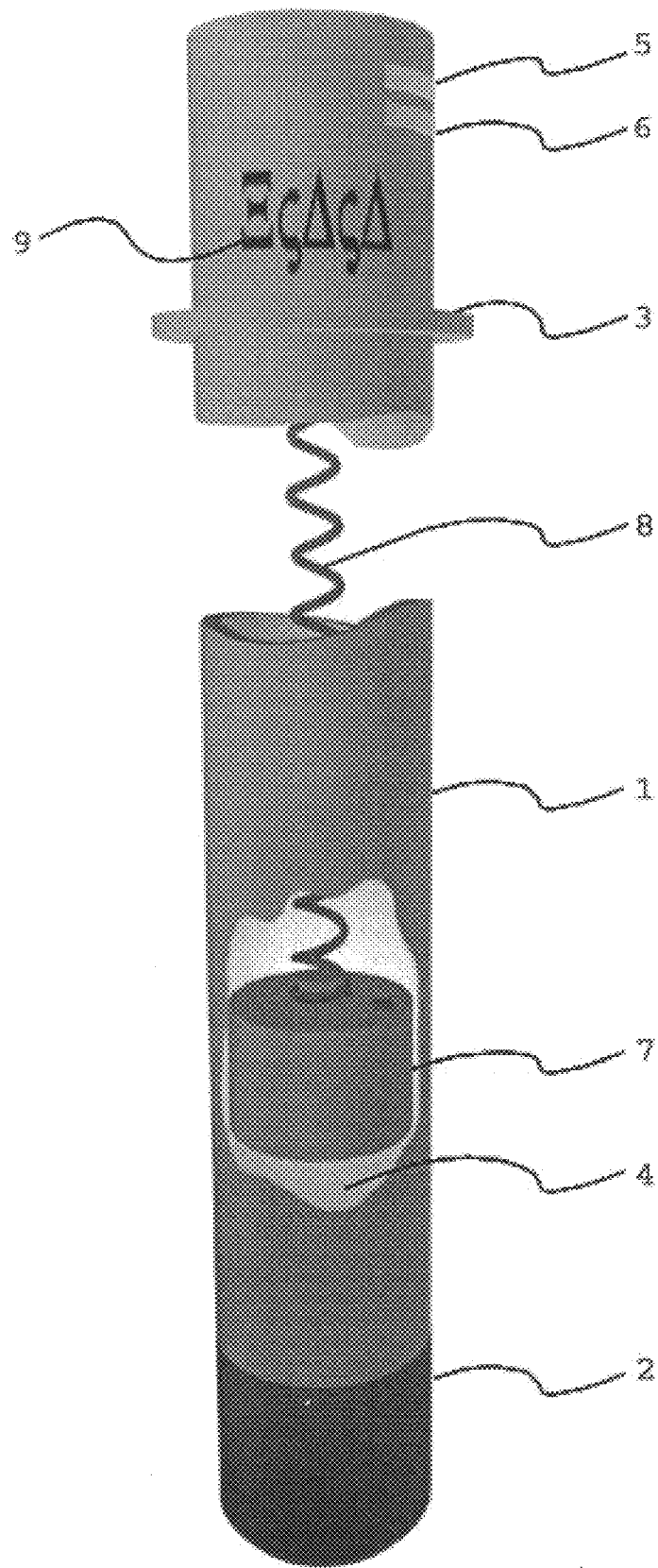
FIG. 1 illustrates the packaging arrangement for the remote communications device in accordance with the present invention.

Referring now to FIG. 1 of the drawings, the rescue device includes a casing 1, a tip 2, an alarm ring 3, a shock absorbing material 4, a solar panel array 5, an antenna array 6, an electronics package 7, cables 8, and cartoon instructions 9.

The casing 1 is tubular in configuration, 12 feet in length, and 12 inches in diameter. The tip 2 is cone-shaped, 18 inches long and is fitted 6 inches into the casing 1. Both the casing 1 and the tip 2 are formed of one inch steel and are welded together. The tip 2 protects the casing 1 from serious damage as the casing penetrates the ground when installed from an air drop.

The alarm ring 3 is a mechanical device located loosely around the exterior periphery of the casing 1 so that, if it is moved in a predetermined manner, a vibration signature is generated to define the cause of the movement. For example, one form of vibration will indicate that the casing 1 is being moved from its installed location, possibly indicating that a theft is in progress. The particular movements that cause alarms are determined empirically.

One way to loosely attach the alarm ring 3 to the casing 1 is with several short, rugged chains. One end of each chain is welded to the casing 1, and the other end of each chain is welded to the alarm ring 3. These chains are spread equally around the casing 1.

A suitable material for the casing 1, for the tip 2, and for the alarm ring 3 is HY80 steel from National Steel and Shipbuilding (General Dynamics), San Diego, Calif.

The exterior of the casing 1 is painted with luminescent paint so that the unit is seen readily at night. A suitable luminescent paint is Strontium Aluminate from Transit Design Group Inc., Canada. The casing 1 is inscribed with one or more cartoon instructions 9 describing the function of the rescue device and instructions for activation to summon help.

Figure 2:
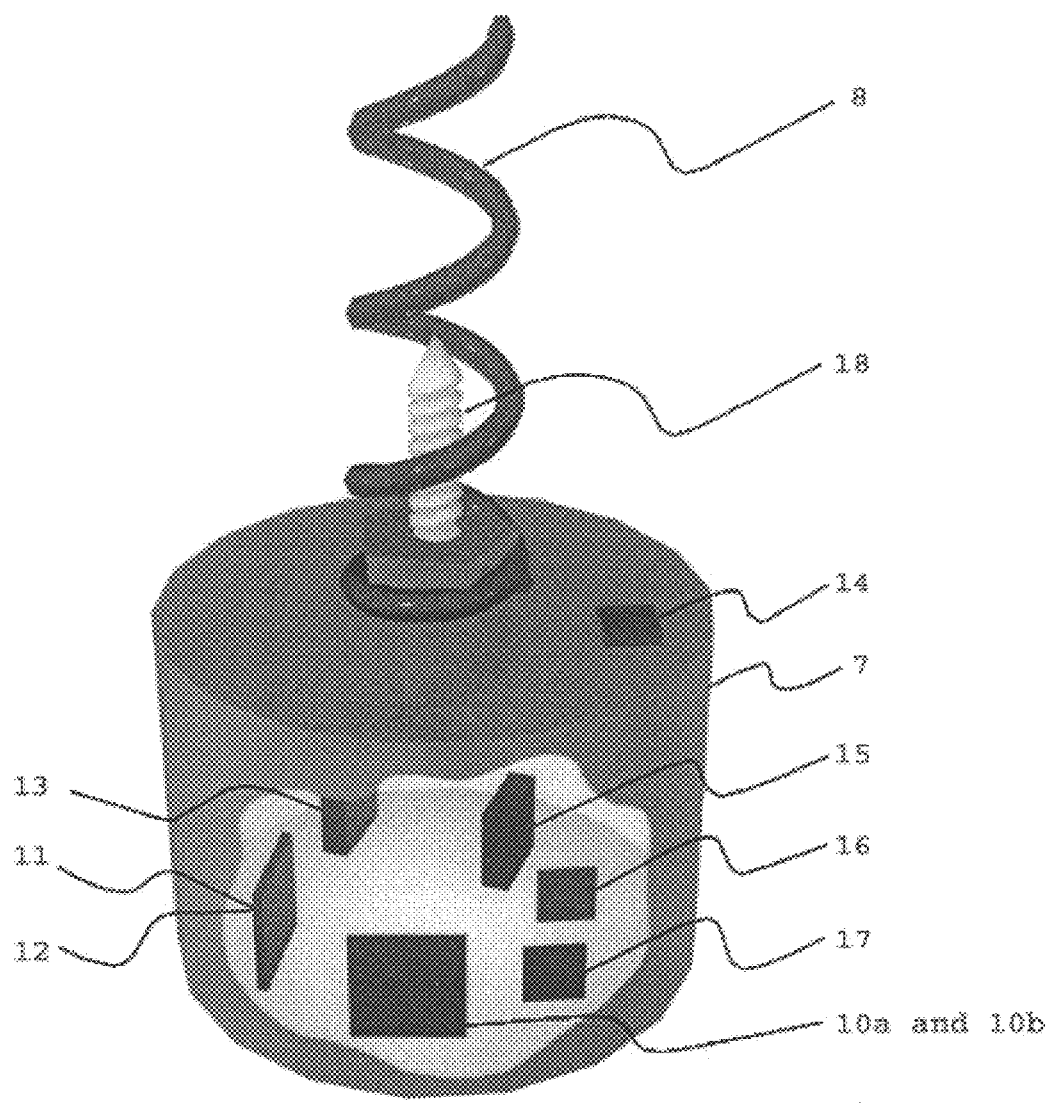
FIG. 2 illustrates the electronics package of the invention.

Referring next to FIG. 2 of the drawings, an electronics package 7 contains 3-axis vibration sensors 10a and 10b, an A/D converter 11, a sensor memory 12, a computer 13, signal device 14 (for producing audible signals), a transceiver/GPS receiver 15, power controller 16, battery 17, and a retaining bolt 18. Therefore, the electronics package 7 is retained in the upper portion of the casing 1 by the retaining bolt 18. The retaining bolt 18 is designed to fail under high stresses such as, for example, when the casing 1 impacts the ground when it is dropped from an aircraft for imbedding it in the ground.

To function properly, the casing 1 must be in good contact with the earth. The rescue device is intended for remote areas where ground access is difficult. An appropriate altitude for dropping the rescue device is determined by dropping a series of test darts.

Figure 3:
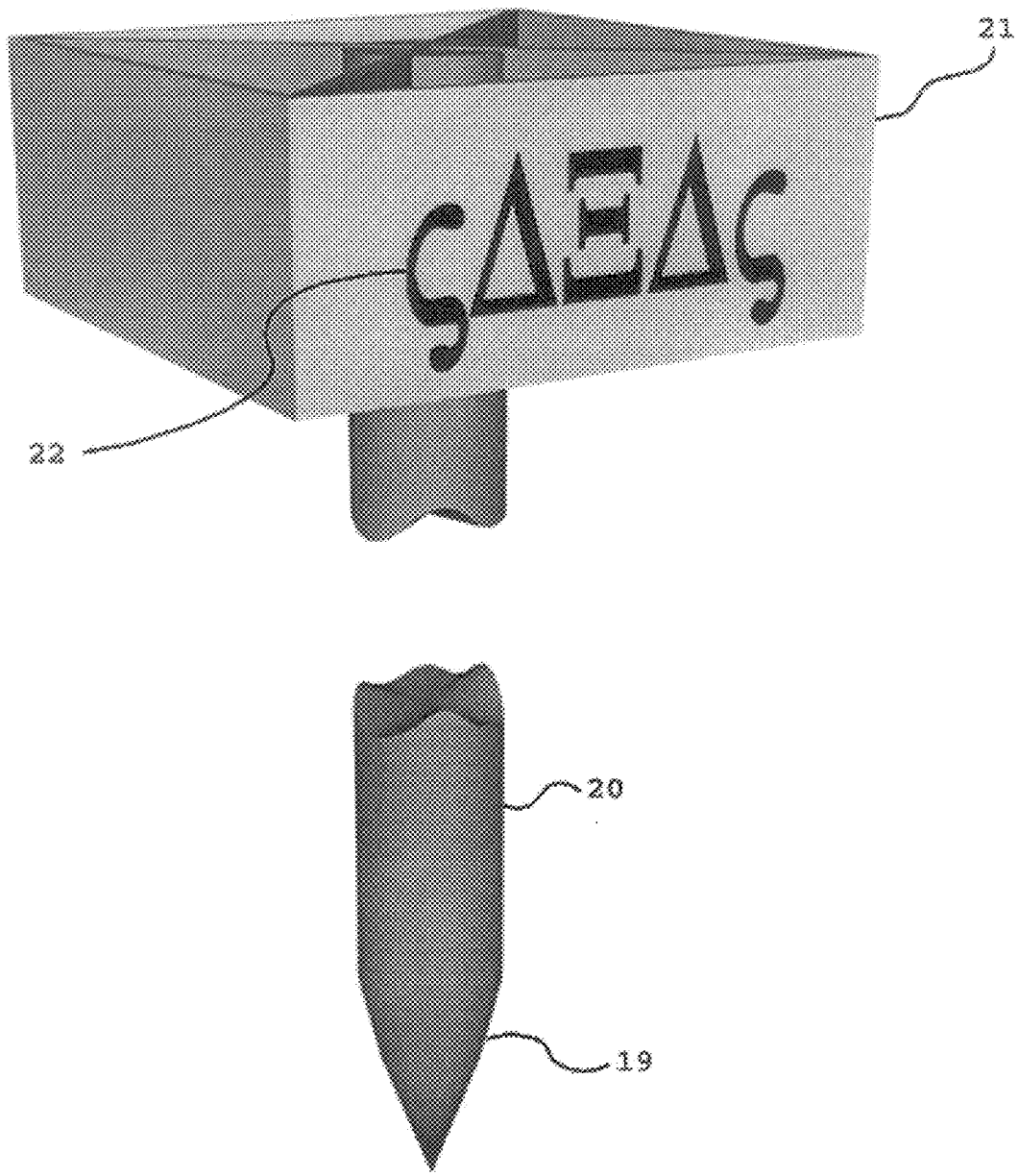
FIG. 3 illustrates a test dart according to the invention.

Referring to FIG. 3 of the drawings, a test dart includes a hardened, tapered tip 19, a solid steel shaft 20 and a fin assembly 21. The shaft 20 is one inch in diameter and four feet long. Each test dart is covered with a material that absorbs sunlight and radiates that energy as light. This material makes the test dart more readily visible during hours of reduced visibility.

A suitable luminescent paint is available from Strontium Aluminate from Transit Design Group Inc., Canada. A legend 22 on the fin assembly 21 indicates that there is a rescue device nearby with symbology and/or messages in one or more languages.

Once an appropriate altitude is determined, a rescue device is dropped and penetrates the earth to achieve the installation. When the casing 1 impacts the earth, the retaining bolt 18 fails which allows the electronics package 7 to slide down inside the casing 1, permitting the cables 8 to uncoil connecting the electronics package 7 to the solar panel array 5 and to the antenna array 6.

The shock absorbing material 4 cushions the electronic package 7 as it slides downward, avoiding damage to the electronics. The rescue device will be partially embedded in the earth, and the electronic package 7 will come to rest at the bottom of the casing 1, thus allowing vibration sensors 10a and 10b to sense vibrations in the casing 1.

The shock absorbing material 4 is made in a form of mount from a two-part rubber material available commercially from Synair Corporation. The rescue device now is ready for use.

An alternative method of installing the casing 1 in an accessible location is by digging a hole similar to a hole dug for installing a fence post. By this means, proper depth in the earth is accomplished even more readily.

Figure 4:
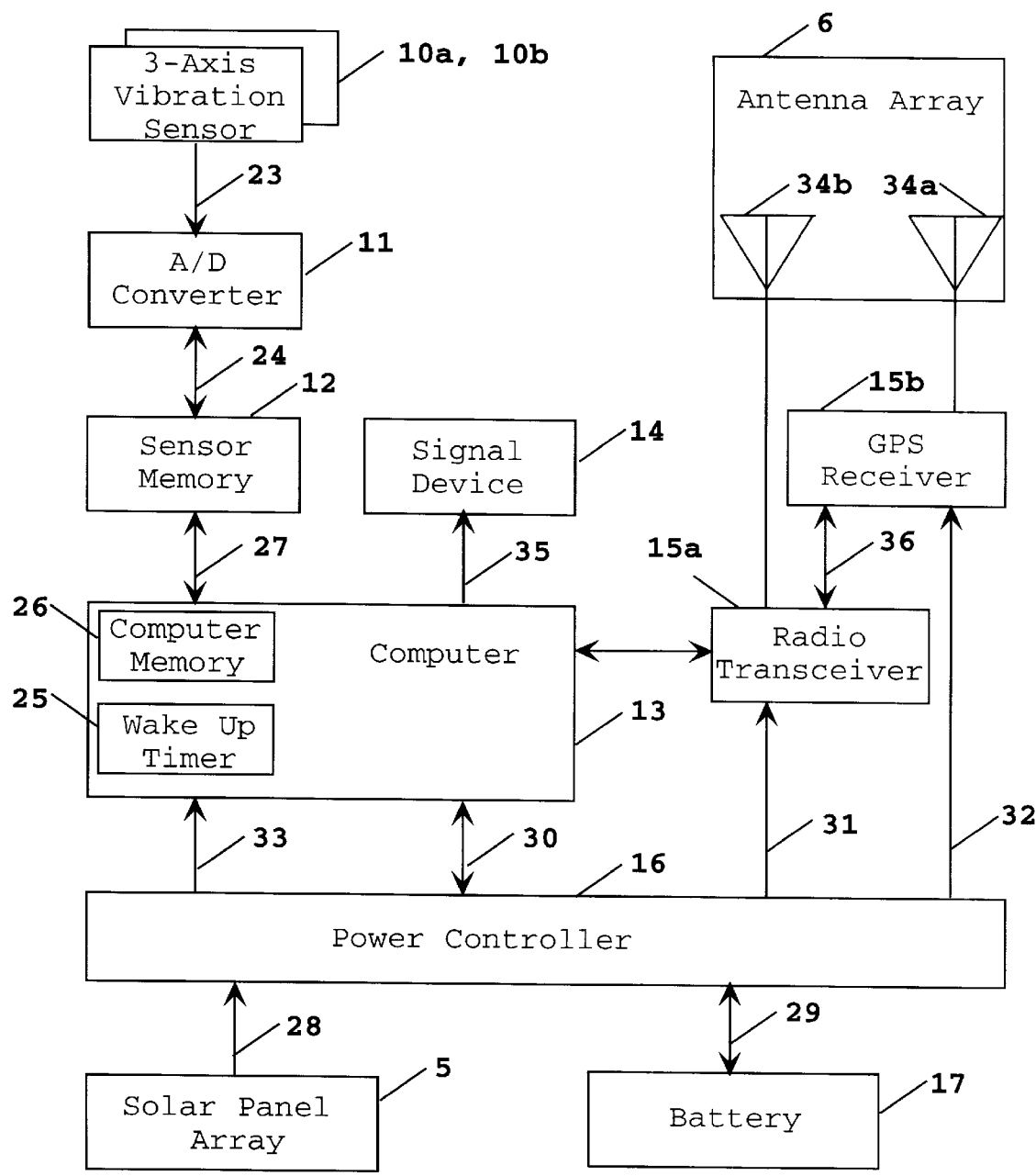
FIG. 4 is a block diagram of the remote communications system of the present invention.

Referring next to FIG. 4 of the drawings, two three-axis vibration sensors 10a and 10b are used to sense vibrations in and around the rescue device. Suitable three-axis sensors are available from the GISCO Corporation, Houston, Tex.

The three-axis vibration sensors provide redundancy and allow the outputs of each pair of vibration sensors to be cumulative, reducing any effect of sensor noise in each sensor. The three-axis sensors 10a and 10b are installed so that like axes are parallel with each other.

The electrical outputs from each three-axis vibration sensor are analog voltages proportional to the vibration on each axis of each vibration sensor. Analog signals are routed to an analog-to digital converter 11 via a bus 23 and to a sensor memory 12 via a data bus 24 and are stored sequentially in the memory 12. The sensor memory 12 stores at least sixty seconds of vibration data.

A computer 13 controls the rescue device and has multiple power saving modes. It includes a wake up timer 25, and a computer memory 26 along with various interfaces. The wake up timer 25 is a programmable timer that can be set to power up the computer at a later time. The computer 13, a model "GCAT 486" available from DSP Design, in Chesterfield, England, has been found to be entirely suitable for this purpose.

In normal operation, the computer 13 periodically (about once a minute) powers up and transfers the contents of the sensor memory 12 to the memory 26 where vibration data is analyzed, collected into a vibration signature and compared to predetermined vibration signatures to determine whether an alarm condition (theft, alarm ring movement, or nearby ground vibration) is indicated. If a match is made, a message is sent to a monitoring facility.

Vibration data collected over a fixed period of time produces a vibration signature. A vibration signature contains data about a particular vibration including amplitude and frequency of vibrations for each vibration axis.

The transceiver 15a and the GPS receiver 15b are connected to the antenna array 6 mounted on the exterior of the casing 1. The antenna array 6 includes both an EHF antenna 34a that receives signals from an orbiting GPS satellite and an UHF antenna 34b that communicates normally with Low Earth Orbit satellites.

A suitable transceiver 15a with an integral GPS receiver 15b is the Satellite Modem available from the Magellan Corporation. A suitable antenna array 6 containing both EHF and UHF antennas is manufactured by Synergy Microsystems.

Communications to and from the transceiver 15a is via the Orbcomm satellite network of Low Earth Orbit satellites. These satellites customarily relay messages between various devices and monitoring facilities.

The signal device 14 is activated by the computer 13 via the bus 35 to alert anyone nearby that an alarm message has been sent. The signal device 14 is a device that produces an audible sound and is vandal resistant. The presently preferred implementation is a type that will strike the casing 1 upon command from the computer 13 to make sufficient noise to be heard readily.

Power for the rescue device of the present invention is provided by both the solar panel array 5 and the battery 17. A suitable solar panel is model "USF-5" from the United Solar Systems Corp., Troy, Mich., and a suitable battery is available from Sanyo.

The battery 17 is for use when the power demands of the rescue device cannot be met by the solar panel array 5 alone. A power controller 16 monitors the output from the solar panel array 5 and from the charge on the battery 17 via a data bus 30 and controls the charging of the battery 17.

The power controller 16 also controls the distribution of power to other subsystems of the rescue device as directed by the computer 13 via the data bus 30. To save power and to reduce the size and cost of the battery 17 and the solar panel array 5, the computer 13 commands the power controller 16 to power up the transceiver 15a and the GPS receiver 15b only when necessary to support the various activities commanded by the computer program.

The computer program for the rescue device of the invention is arranged and configured to monitor those vibrations that meet a pre-programmed criteria which will formulate, encrypt and transmit a message to any Low Earth Orbiting satellite of a type to receive such message.

The message then is returned to a ground station established for that purpose. Such a message can be routed in any desired manner, such as, for example, to the Internet as an e-mail message, or to cell phones, or to pagers, or even to other computers.

Vibration data from corresponding axes of the vibration sensors 10a and 10b are additive: X with X'; Y with Y'; Z with Z'. The vibration signatures obtained are processed and compared to stored predetermined vibration signatures allowing various alarm conditions to be identified.

Whether an alarm vibration signature is or is not detected, afterwards the application program clears the sensor memory 12, resets the wake up timer 25 to 60 seconds, and puts the computer 13 into a power saving mode.

Should the vibration signature indicate that the alarm ring 3 has in fact been moved, then the pattern of movement is determined by the application program. For example, if the pattern of this movement indicates that the alarm ring 3 has been moved several times, an ASCII message is formulated for transmission by the transceiver 15a.

The transmitted message includes an identification number of the particular rescue device and information describing the type of anomaly detected. Before transmission, each message is encrypted. A suitable encryption technique is a "One Time Pad" encryption.

Although the rescue device is suited uniquely for use in remote locations, it can be used in areas that are accessible and where it is possible the rescue device might be subject to theft. The physical process of stealing the device is such that it would cause vibrations to be sensed by vibration sensors 10a and 10b. In this instance, the vibration signature would indicate that a theft is in progress, and the application program will set a "theft" flag.

If a "theft" flag is set, the application program directs the power controller 16 to power up the GPS receiver 15b; interrogates the GPS receiver 15b via the transceiver 15a to obtain the derived longitude and latitude of the unit's present location. This location information message is transmitted via the transceiver 15a and the UHF portion of the antenna array 6 to the monitoring station via the satellite network of Low Earth Orbit satellites.

This message is sent to the transceiver 15a using the commands required to set up the transceiver 15a and to transmit a message data packet. The data packet is sent to the transceiver 15a via the computer system serial port for transmission to a satellite network of Low Earth Orbit satellites.

The application program then examines the status of the "theft" flag. If the flag is "off", the wake up timer 25 is set to sixty seconds, and the computer sets itself into a low power mode. The computer goes to "sleep". It will awake at the next wake up in sixty seconds.

If the "Theft" flag is "on", the wake up timer is set to five minutes. Only a command from an Authorized User can turn the "theft" flag "off". Such User is an individual who is-approved by the sponsor of the rescue system.

On the other hand, if the anomaly being reported is an alarm ring "event", then the computer system now sends a series of pulses —evenly spaced over ten seconds—to the signal device 14 which strikes the casing alerting anyone nearby that their message has been sent.

The rescue device of the invention can receive messages as well as send them. After the wake up timer 25 has brought the computer 13 to full power, the computer 13 can, under application program control, receive messages from a Low Earth Orbiting Satellite configured to send such messages.

The present invention has been described in substantial detail as the presently preferred embodiment. However, it is understood that the invention is not limited by the embodiment described, but rather, the invention is intended to include various modifications and the various equivalents that are covered by the spirit and scope of the appended claims.

For instance, the present invention can transmit messages to Authorized Users via the Internet, and it can be used to monitor seismic events, such as earthquakes and for surveillance, and send these data to a monitoring facility. Therefore, it is understood that all such changes, modifications, alterations, and equivalents are included within the scope of the following claims.

What is claimed is:

1. A rescue device to signal for help from a remote area, said rescue device comprising:
   a) a casing having inner and outer surfaces, and said casing being arranged to be mounted vertically, and having a top and a bottom;
   b) markings on said outer surface of said casing indicating how to use said rescue device to signal for help;
   c) a vibration sensor mounted on said inner surface of said casing for detecting vibrations;
   d) means mounted to said outer surface of said casing to induce vibrations in said rescue device;
   e) said vibration inducing means includes a ring surrounding and movably attached to said outer surface of said casing;
   f) communications means within said casing activated by said vibration sensor for sending a signal for help; and
   g) said communications means having transmitter and antenna means for sending signals, said transmitter means is contained within said casing, said antenna means is flush mounted to said casing, and said transmitter means is connected electrically to said antenna; whereby help will be summoned when the casing is vibrated.

2. The device of claim 1 including a conical tip having a point attached axially aligned to said bottom of said casing with said point down, and a movable shock mount within said casing supporting said transmitter, whereby said rescue device may be installed by air dropping into the ground.

3. The rescue device of claim 1 including a Global Positioning System (GPS) receiver within said casing, a GPS antenna mounted to said top of said casing and connected electrically to said GPS receiver, and an electronic controller means within said casing connected electrically to said vibration sensor, transmitter means, and GPS, whereby the location of said rescue device may be communicated automatically.

4. The device of claim 3 including a conical tip having a point, said tip attached axially aligned to said bottom of said casing with said point down, a movable shock mount within said casing, said transmitter means, GPS receiver, and electronic controller means are mounted to said shock mount, whereby said rescue device may be installed by air dropping.

5. The device of claim 1 additionally comprising a coating on the outer surface of said casing, which coating glows in the dark.

* * * * *